United States Patent [19]

Smith

[11] Patent Number: 4,556,190

[45] Date of Patent: Dec. 3, 1985

[54] MOLD FOR GROMMET MOUNTED CONNECTOR

[75] Inventor: Gregory A. Smith, North Webster, Ind.

[73] Assignee: Lyall Electric, Inc., Kendallville, Ind.

[21] Appl. No.: 558,179

[22] Filed: Dec. 5, 1983

[51] Int. Cl.⁴ .............................................. B29C 6/04
[52] U.S. Cl. ...................................... 249/99; 249/95; 249/97; 249/160; 264/272.15; 264/275; 264/318; 339/125 R; 339/218 R; 425/116; 425/DIG. 58
[58] Field of Search ................................. 249/95–97, 249/160, 98–101, 117, 145; 264/272.11, 272.15, 318, 275; 339/218 R, 218 M, 119 R, 125 R; 425/116, 542, DIG. 58

[56] References Cited

U.S. PATENT DOCUMENTS

| | | | |
|---|---|---|---|
| 2,012,800 | 8/1935 | Allen | 249/145 |
| 2,390,821 | 12/1945 | Willcox | 264/272.11 |
| 3,044,127 | 7/1962 | Alden | 264/328.8 |
| 3,166,795 | 1/1965 | Joffe | 249/142 |
| 3,874,766 | 4/1975 | Mizusawa | 339/125 R |
| 4,099,274 | 7/1978 | Emberson | 339/125 R |
| 4,349,174 | 9/1982 | Obrist et al. | 249/99 |

Primary Examiner—Jay H. Woo
Assistant Examiner—James C. Housel
Attorney, Agent, or Firm—Roger M. Rickert

[57] ABSTRACT

Fabricating techniques for forming insulated electrical connectors of the type to be subsequently mounted in panel apertures including techniques for simplifying the mold required to form such connectors and improvements in the connector itself and the manner in which that connector grips edges of an aperture in which it is mounted are disclosed. In its preferred form, the insulated electrical connector has a pair of generally flat parallel opposed side walls each provided with staggered notches oppositely extending from opposed side wall edges toward and slightly past one another in an overlapped and interleaved manner to form in the region of notch overlap a pair of slots extending generally parallel to one another and transverse to the notches.

7 Claims, 4 Drawing Figures

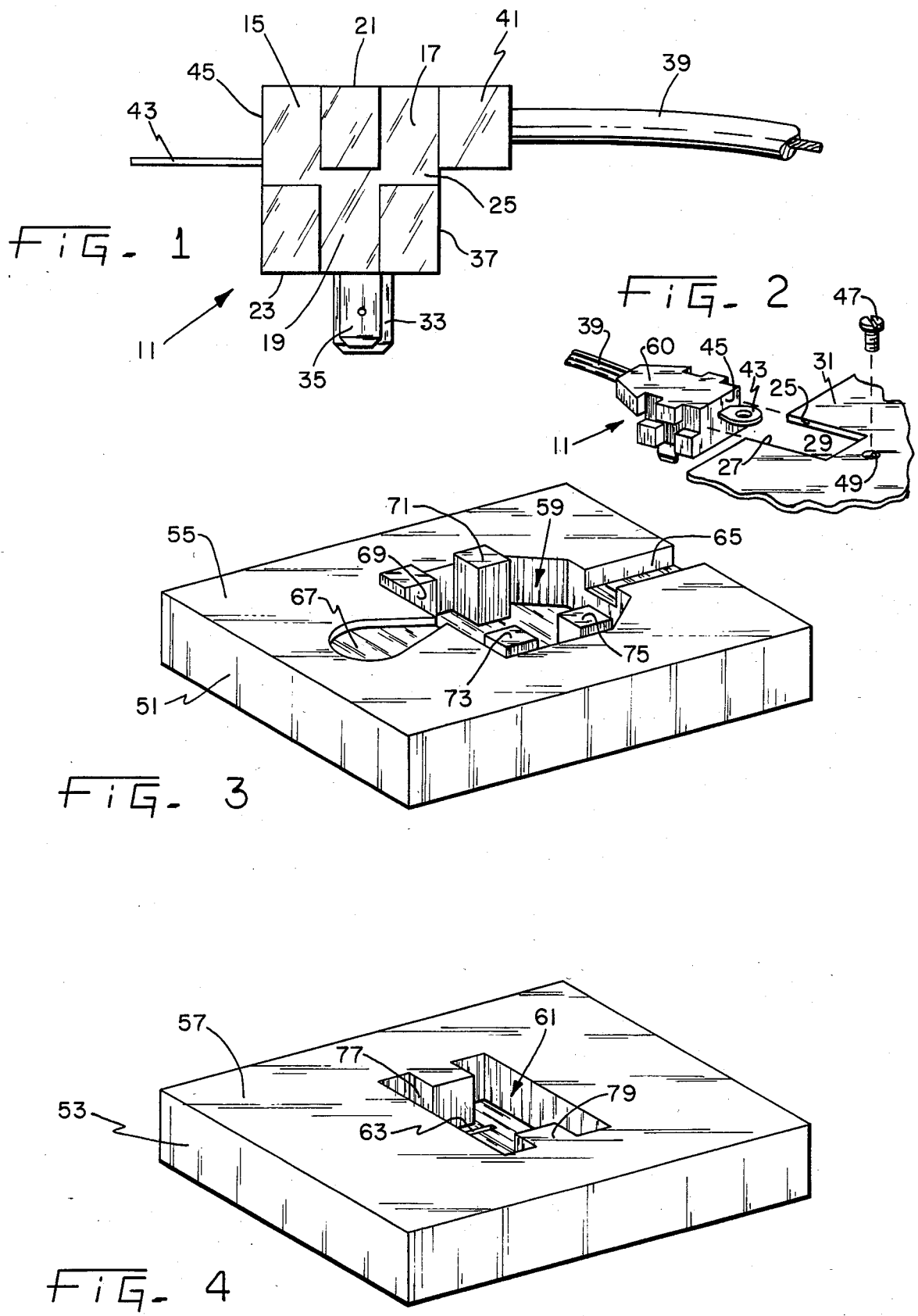

MOLD FOR GROMMET MOUNTED CONNECTOR

BACKGROUND OF THE INVENTION

The present invention relates generally to electrical connectors which are panel mounted and more particularly to methods and apparatus for molding such plugs and the resulting mounting slot configuration in such connectors induced by such methods and apparatus.

It is frequently desirable to mount an electrical connector such as a plug or socket having two or three terminals permanently in some sort of panel or housing associated with an appliance or other electrical device. One rather common technique for accomplishing such mounting of electrical connectors is to provide an irregular hole in the panel and a matching irregular configuration to the connector so that the connector may be passed part way into the irregular hole and then translated or rotated so as to lock the connector within the hole. Another technique for mounting such connectors in the panels is to provide tapered locking lugs on the connector so that the connector may be forced into a hole with the locking lugs deformed somewhat along their tapered slope until the tapered portion passes completely through the panel aperture whereupon that tapered portion reexpands to its original configuration securing the connector in panel.

To more securely resist potentially dislodging forces generally perpendicular to the panel surface as well as resisting inadvertent twisting or translating of such an electrical connector resulting in its being dislodged from the panel, some electrical connectors have been provided with a pair of opposed laterally extending slots of generally rectangular cross sectional configuration with such connectors being intended for mounting in open ended apertures in panels. Of course, such configuration is easily translated and removed from such an open ended aperture, however, in cases where grounding of the electrical connector to the panel in which it is mounted is desired, a ground lug secured to the connector and having a screw or bolt receiving opening may be physically fastened to the panel after the connector is in position providing the dual benefit of grounding the connector as desired and further precluding its translation and removal from the panel.

In other installations the plug may be mounted in a cabinet bottom near the rear thereof and assembly of the cabinet back wall adjacent the plug receiving bottom notch will hold the plug securely in position. Numerous variations on this scheme are possible.

This last mentioned type connector and panel mounting scheme has met with considerable commercial success, however, this type connector is more costly than necessary due primarily to the complexity and high initial cost of the mold for fabricating such a connector and in particular the complexity of the mold for forming the parallel extending mounting slots in the generally parallel opposed side walls of the connector.

The molds heretofore used for forming insulating material about electrically conductive portions to form such electrical connectors include a pair of mold halves separable along a parting plane which when joined define a connector forming mold cavity and further include a pair of movable members, often referred to as cam pull sections, which extend somewhat into the cavity generally along the parting plane to form the desired slots and thereafter when it is desired to remove the form connector from the mold these cam pull sections must be moved laterally away from the connector typically by a cam actuating mechanism to provide the necessary clearance for removing the formed connector from the cavity. Mechanisms for actuating these cam pull sections, the mold configuration to accept the movable sections, as well as the sections themselves all contribute to the substantial initial mold investment for fabricating such connectors. It would be highly desirable to somehow reduce this significant investment while retaining the advantages of such laterally inserted electrical connectors.

SUMMARY OF THE INVENTION

Among the several objects of the present invention may be noted the provision of an electrical connector having opposed generally parallel slots in the side walls thereof for lateral insertion and removal in an open ended panel aperture; the provision of a unique mold arrangement for forming laterally mountable electrical connectors the only moving cavity forming parts of which are the mold halves themselves; the provision of a method of forming a mounting slot in a side wall of an insulated electrical connector characterized by its simplicity and lack of moving mold parts; and overall improvments in electrical connectors and their fabricating techniques and equipment. These as well as other objects and advantageous features of the present invention will be in part apparent and in part pointed out hereinafter.

In general, a mold for forming electrical connectors has a pair of cavity forming halves separable along a parting plane and includes an improved arrangement for forming one or more slots in such connectors comprising a plurality of upstanding posts within the cavity halves of the mold at least some of which extend beyond the parting plane and into the other cavity half when halves are closed on one another. The posts are arranged in an overlapping and interleaved manner near the parting plane so that the region of overlap forms therealong the connector slot.

Also in general and in one form of the invention, a mounting slot is formed in the side wall of an insulated electrical connector by providing at least a pair of spaced generally parallel notches of uniform cross section extending from a side wall edge toward the opposite side wall edge and providing at least one notch of uniform cross section extending from the opposite side wall edge toward the said one side wall edge with the notches extending sufficiently far so that the one notch extends between the other two notches an overlap distance with that overlap defining the width of a slot which extends transversely to the direction of extension of the respective notches. The insulated connector formed by such a technique may have a pair of generally flat parallel opposed side walls with each of those side walls provided with such staggered oppositely extending notches so that the regions of notch overlap create a pair of slots extending generally parallel to one another along the opposed side walls.

BRIEF DESCRIPTION OF THE DRAWING

FIG. 1 is a side elevation view of an insulated electrical connector with one of the generally flat parallel opposed side walls having staggered notches visible;

FIG. 2 is a perspective view of the electrical connector of FIG. 1 in alignment with an open apertured mounting panel portion perparatory to mounting the connector on the panel;

FIG. 3 is a perspective view of one mold half for forming the electrical connector of FIGS. 1 and 2; and FIG. 4 is a perspective view of the other mold half for forming the connector of FIGS. 1 and 2.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring first to FIGS. 1 and 2, an insulated electrical connector 11 configured generally in the form of a rectangular parallelepiped has a pair of generally flat parallel opposed side walls parallel to the plane of the paper in FIG. 1 each of which is provided with staggered notches 15, 17 and 19 extending from the opposed side wall edges 21 and 23 respectively, and slightly past one another in an overlapped and interleaved manner in the region 25 with that region extending generally horizontally across the visible face of the connector in the form of a slot. The slot extends generally transverse to the notches and, of course, the opposite face not visible in FIG. 1 has a similar slot similarly formed by overlapping notches so that the two slots extend generally parallel to one another for receiving opposed edges 25 and 27 of an open ended aperture 29 in an illustrative panel 31.

Also parallel to the general direction of extension of the slots in the side walls is a lower connector face which is provided with a pair of electrical terminals 33 and 34 here illustrated as the prongs of a somewhat conventional plug. A rightwardly facing face 37 has a three wire power cable 39 passing through a strain relief portion of insulating material 41 and extending away therefrom for connection to other electrical elements as desired. Cable 39 may include a pair of electrical leads one each connected to the prongs or terminals 33 and 35 and further a ground wire electrically connected to the lug 43 which extends from connector face 45.

The notched configuration on the opposed side walls of plug 11 may also be thought of as the provision of a staggered series of posts between which the mounting slot is defined. Assembly of the plug to a panel is easily understood in FIG. 2 where the plug is laterally aligned with panel 31 having an open ended notch 29. Plug 11 is simply moved laterally into the open ended notch 29 with the slot edges, that is the faces of the six laterally extending posts, spanning the thickness of mounting panel 31 so as to prevent its removal in any direction other than the lateral direction in which it is inserted. Plug 11 is then secured in position and at the same time electrically grounded to the panel 31 by passing a screw 47 through the lug 43 and into a hole 49 in panel 31 so as to anchor the plug 11 in position.

FIGS. 3 and 4 illustrate respective mold halves 51 and 53 with many conventional injection molding features omitted to emphasize the unique features of the mold as well as the unique features of the method of the present invention. Thus, for example, conventional arrangements for aligning the mold halves, closing and opening the mold halves and introducing insulating material into the mold cavity are omitted for clarity. The mold halves 51 and 53 are intended to be joined along a parting plane defined by either of the planar surfaces 55 and 57 which are, of course, juxtaposed when the mold is ready to receiving insulating material. Each mold half includes a connector forming cavity half 59 or 61 and, as seen in FIG. 4, cavity 61 includes near the bottom thereof a slot 63 for receiving and supporting the terminal or prong 33 with a similar slot for receiving prong 35 not being visible in FIG. 4. The flat bottom surface of cavity 59 forms the upper face 60 of connector 11 while the flat bottom surface of cavity portion 61 forms the face from which prongs 33 and 35 extend. Similarly the mold half 51 includes an elongated passage 65 for receiving the three wire power cable 39 and a shallow cavity 67 for receiving the lug or anchor member 43. With the electrical components properly connected and positioned within the closed mold halves, insulating material is then injected into the mold and allowed to cool or solidify before the halves are parted and the completed connector 11 removed therefrom.

To form the notches 15, 17 and 19 and similar notches on the opposite face of the connector 11 a series of upstanding posts 69, 71, 73, 75, 77 and 79 are positioned within the cavity halves with the first four mentioned posts in cavity half 51 extending somewhat above the surface of parting plane 55 while posts 77 and 79 have their uppermost surfaces flush with the parting plane surface 57 so that when the two mold halves are mated, the posts overlap one another slightly to define the slot or region 25 in the connector. Each post is illustrated as a rectangular parallelepiped which lies flat against and extends along the respective cavity half side walls so that when the posts are interleaved and the mold halves closed, the notch forming posts overlap in the same pattern as the overlap in the resulting connector as illustrated in FIG. 1.

While the present invention has been described in the environment of an electrical connector, it should now be clear that the techniques of the present invention are applicable to a wide variety of other grommet-like structures such as conventional wire passing grommets, part mounting posts, cabinet or chassis legs or feet, and the like.

From the foregoing it is now apparent that a novel electrical connector, connector mold, and scheme for fabricating such connectors in such molds have been presented meeting the objects and advantageous features set out herein before as well as others and that modifications as to the precise configuration, shapes and details may be made by those having ordinary skill in the art without departing from the spirit of the invention or the scope thereof as set out by the claims which follow.

What is claimed is:

1. In a mold for forming insulating material about electrically conductive portions to form an electrical connector, the mold having a pair of mold cavity forming halves separable generally along at least one parting plane for removing formed electrical connectors from the mold, the improvement for forming a pair of generally parallel slots in opposed generally parallel sidewalls of such electrical connectors comprising a plurality of upstanding posts within the cavity halves immediately adjacent opposite connector sidewall forming cavity half sidewalls at least some of which extend beyond the parting plane and into the other cavity half when the halves are closed on one another, the posts of one cavity half directly contacting and overlapping the posts of the other mold half in an interleaved manner near the parting plane with the region of post overlap forming the connector slots.

2. The improvement of claim 1 wherein each post is generally configured as a rectangular parallelepiped.

3. The improvement of claim 1 wherein each post extends along a cavity half side wall.

4. The improvement of claim 3 wherein one cavity half has four posts and the other cavity half has two posts.

5. In a mold for forming material into a grommet-like structure, the mold having a pair of mold cavity forming halves for forming at least a pair of open slots in sidewalls of the structure, the halves being separable for removing formed structures from the mold, the improvement comprising a plurality of upstanding posts within the cavity halves adjacent sidewalls thereof at least some of which extend into the other cavity half when the halves are closed on one another so that the posts of one cavity half directly contact and overlap the posts of the other cavity half in an interleaved manner with the region of post overlap effectively forming the open slots in the sidewall of the structure.

6. The improvement of claim 5 wherein each post is generally configured as a rectangular parallelepiped.

7. The improvement of claim 5 wherein one cavity half has four posts and the other cavity half has two posts.

* * * * *